United States Patent [19]

Nakano

[11] Patent Number: 5,497,413
[45] Date of Patent: Mar. 5, 1996

[54] TELEPHONE SYSTEM WITH MESSAGE RECORDING FUNCTION

[75] Inventor: Kazuo Nakano, Niiza, Japan

[73] Assignee: Kabushiki Kaisha Toshiba, Kawasaki, Japan

[21] Appl. No.: 181,237

[22] Filed: Jan. 13, 1994

Related U.S. Application Data

[63] Continuation of Ser. No. 95,255, Jul. 22, 1993, abandoned, which is a continuation of Ser. No. 711,131, Jun. 6, 1991, abandoned.

[30] Foreign Application Priority Data

Jun. 8, 1990 [JP] Japan .................................. 2-148771

[51] Int. Cl.$^6$ ............................... H04J 3/12; H04M 1/57
[52] U.S. Cl. ............................ 379/89; 379/88; 379/142; 379/245; 379/374
[58] Field of Search ................... 379/67, 88, 89, 379/142, 233, 245, 374, 196; 370/62

[56] References Cited

U.S. PATENT DOCUMENTS 4,922,490  5/1990  Blakley ........................... 370/62
5,023,868  6/1991  Davidson et al. ................. 379/88
5,199,062  3/1993  Von Meister et al. ........... 379/205
5,200,994  4/1993  Sasano et al. ..................... 379/142
5,282,243  1/1994  Dabbaghi et al. ................ 379/201

Primary Examiner—Jeffery Hofsass
Assistant Examiner—Fan Tsang
Attorney, Agent, or Firm—Finnegan, Henderson, Farabow, Garrett & Dunner

[57] ABSTRACT

A telephone system having a message recording function which records in a voice mail recorder a voice message received from a calling party during absence of a called party and vocally reproduces the recorded message in response to a request from called party. The telephone system, which is preferably connected with such a network that a calling party identification data is included in an incoming signal, comprises a voice conversion means for converting a telephone number of the calling party into a voice signal on the basis of the calling party identification data and a control means for vocally reproducing the calling party's telephone number converted into the voice signal together with the voice message from the calling party recorded in the voice mail recorder, whereby, even when the calling party himself does not leave his telephone number in the message, the called party can listen to and know the telephone number as part of the voice message from the calling party.

8 Claims, 3 Drawing Sheets

TELEPHONE SYSTEM WITH MESSAGE RECORDING FUNCTION

This application is a continuation of application Ser. No. 08/095,255, filed Jul. 22, 1993, now abandoned, which is a continuation, of application Ser. No. 07,711,131, filed Jun. 6, 1991, now abandoned.

BACKGROUND OF THE INVENTION

1. Field of the Invention

The present invention relates to a telephone system with a message recording function in a network such as an integrated services digital network (ISDN), in which a called party receives an incoming call together with a calling party identification data, which system records a voice message from the calling party received in the absence of the called party, in a voice mail recorder which reproduces the recorded message as the called party demands, and more particularly a system which facilitates the identification of the calling party of the voice message recorded in the voice mail recorder.

2. Description of the Related Art

A typical electronic private branch exchange is arranged so that a called party can set a voice mail recorder for the purpose of coping with such a situation that the called party receives an incoming call from a central office line during his absence, for example, in the nighttime.

In an automatic answering telephone system, when the user of the telephone set leaves home, the user can temporarily set a voice mail recorder to receive a message from a calling party during his absence.

The voice mail recorder records a voice message from a calling party directed to an absent called party and reproduces the recorded voice message through a telephone set when the called party gives a reproduction request to the recorder through the telephone set.

Most telephone systems equipped with such a voice mail recorder include a response device for sending a response message (voice message) to the calling party upon the reception of the incoming signal during the absence of the called party to ask the calling party whether he wants to leave a message, and in case he wants to do so, requests him to send calling party message. The response device comprises, for example, a voice ROM for storing voice data corresponding to the response message and a voice composer for reading out the recorded voice data and sounding it as a voice signal. The response device, when receiving the calling party voice message from the calling party responsive to the response message, causes the calling party voice message to be recorded in the voice mail recorder. In a telephone system including a plurality of telephone sets as extension-line terminals, a relay board and a voice mail recorder which are exchanged under control of a private branch exchange, when a called party is absent but an operator in charge of the relay board is present, the operator of the relay board can carry out such processing as asking the calling party whether he wants to leave message to the called party and if he desires so, setting the voice mail recorder as its message receiver and letting the calling party send the message.

Such a voice mail recorder usually has a memory area called memory box for recording the voice message. The memory box is divided into a plurality of blocks each having box number. The blocks are controlled on the basis of the respective box numbers. Each block is further divided into a plurality of subareas for storing one voice message. Accordingly, the time length of one voice message is determined by the capacity of the subarea. In the telephone system having a private branch exchange, the box numbers are usually assigned corresponding to the extension line numbers of these telephone sets.

Explanation will be made as to how to use the voice mail recorder on the assumption that the voice mail recorder is employed in a telephone system having an electronic private branch exchange.

Supposing that a called party is an extension line B and when a call is received from a calling party A through a central office line to the voice mail recorder during nighttime and the calling party A wishes to leave a message to the called party (the extension line B), then the calling party A informs the voice mail recorder by means of a dual-tone multifrequency tone of a box number corresponding to the extension line B together with a proper code (special number) indicative of a box number input. Then in response to the above-mentioned response message (or according to his or her guide message in the case where an operator is in charge of the relay board), the calling party A sends a desired message directed to the extension line (called party) B in a predetermined time. The voice mail recorder, when receiving the box number, retrieves non-recorded message one of the subareas of the block corresponding to the received box number and records the message sent from the calling party A in the retrieved subarea, which recording operation is completed after passage of a predetermined constant time.

Meanwhile, when the called party of the extension line B wishes to extract the message directed to his own extension from the voice mail recorder, the called party B acts as follows.

That is, the called party B dials an extension line number (extension line directory number of the voice mail recorder) allocated to the voice mail recorder on the telephone set assigned to the extension line B. When the voice mail recorder responds to this dialing operation, the called party B further dials the box number (which is often used together with a password) corresponding, e.g., to the extension line B to ask his own message. Responsive to it, the voice mail recorder retrieves the memory subarea corresponding to the dialed box number, reads out the recorded message of the calling party A therefrom and sends it to the extension line B. In this way, the called party can receive the message of the calling party A sent during his absence.

The called party B can know the presence or absence of a message arrival directed to the user of the extension line B, by means of:

A message registration indication on a display part of the associated telephone set or by means of a specific lamp previously allocated therefor.

Message retrieving operation of the voice mail recorder through the associated telephone set.

In such a prior art telephone system, the above registration of the voice message can be realized even when the calling party A already knows a key telephone number of such an organization having the above private branch exchange as a company or an office but he does not know the box number of the party as a called party.

With the prior art telephone system, the memory area for exclusively registering a message having an unknown box number is usually previously prepared in the voice mail recorder, that is, the received message having the not-specified box number is automatically recorded in the previously-prepared exclusive area of the voice mail recorder.

Later, the operator in charge of the relay board can listen to the message of the unknown box number recorded in the exclusive area, confirm the extension line B of the called party on the basis of the listened destination and contents, and then inform the message contents of the corresponding party, e.g., the extension line B. Even in this case, if the operator is present and in charge of the relay board at the time of receiving the incoming signal, then the operator can assign the corresponding box number of the specified called party, i.e., the user of the extension line B to the message and then can register the message having the specified box number.

In any case, the user of the extension line B having received the message budges the calling party from the contents of the received message, and calls back to the calling party if necessary by checking the telephone number of the calling party.

With such a telephone system which can record a message received from a calling party in the voice mail recorder and can vocally reproduce the message recorded in the voice mail recorder in response to a reproduction request by a called party or by such an operator as a person in charge of the relay board, the message from the calling party can be left in the form of a voice message even when the called party is absent as in nighttime, whereby the telephone system can be reliably, simply and efficiently utilized in nighttime or as an automatic answering telephone system.

However, in this telephone system, all the message data from the calling party, i.e., the telephone number, name and so on of the calling party are all obtained from this voice message, so that, if the calling party fails to leave such a calling party identification data as his own telephone number in the form of a voice message, then it is difficult for the called party to immediately specify the calling party's telephone number even on the basis of the received message. That is, even when the called party wishes to call back to the calling party, the called party must check the calling party's telephone number every time the called party does not know it by heart.

The prior art telephone system has another problem that, since the voice message recorded and registered in its exclusive area in the voice mail recorder as a message having an unknown box number is informed from the operator of the relay board to the corresponding called party as explained above, the contents of the message might not be able to be sufficiently transmitted to the called party. In addition, such a message that requires its confidentiality between the calling party and the called party cannot be left in such a voice mail recorder.

Furthermore, even when the calling party himself or the operator in charge of the relay board assigns a box number corresponding to the called party, this operation is highly troublesome from the viewpoint of its manual handling operation.

SUMMARY OF THE INVENTION

In view of such circumstances, it is therefore an object of the present invention to provide a telephone system in which, even when calling party's identification data is not left in a message from the calling party, a called party can automatically know the calling party's identification data only by issuing a reproduction request for the message from the calling party.

Another object of the present invention is to provide a telephone system which, even when a box number corresponding to a called party is unknown in a voice mail recorder, enables automatic registration of a voice message from the calling party for the box number of the corresponding called party or a group to which the called party belongs.

In accordance with an aspect of the present invention, the above object is attained by providing a telephone system with a message recording function which is connected to a network to receive an incoming signal containing a calling party identification data and which comprises:

(a) a voice conversion means for converting at least a telephone number of a calling party into a voice signal on the basis of the calling party identification data; and (b) a control means for reproducing the calling party identification data converted into a voice signal together with the voice message from the calling party recorded in a voice mail recorder.

In accordance with another aspect of the present invention, there is provided a telephone system of a message recording function which is connected to a network to receive an incoming signal containing a calling party identification data and a called party identification data and which, in addition to the voice conversion means (a), comprises:

(c) a table means for previously defining a correlation between the called party identification data and a plurality of voice message recording areas in the voice mail recorder which are allocated in one to one relationship; and (d) a control means for deciding one of the recording areas of the voice mail recorder with respect to the voice message from the calling party by referring the called party identification data to definition of the table means, for recording the voice message in the decided recording area and in response to a reproduction request from the called party, for vocally reproducing the recorded voice message associated with the called party identification data of the called party together with the calling party identification data converted into the voice signal.

With the former arrangement of the present invention, at least calling party's telephone number as the calling party identification data is converted into the same voice signal as the voice message through the voice conversion means (a) and the converted telephone number is vocally reproduced together with the voice message from the calling party, so that, when the called party issues a reproduction request for the message, the called party can listen to and know the calling party's data (telephone number, etc) converted into the voice signal as if it were part of the voice message from the calling party. For this reason, when the called party wants to call back to the calling party, it becomes unnecessary for the called party to learn the telephone number by heart and thus the need for checking the telephone number troublesomely can be eliminated.

As a technique for vocally reproducing the calling party's telephone number and voice message together, when the control means (b) is arranged, at the time of receiving an incoming signal, to record in the voice mail recorder the calling party's data converted into the voice signal together with the voice message from the calling party, the combined vocal reproduction of these data and voice message can be realized reliably through a very simple control procedure.

With the latter arrangement of the present invention, since the voice message recording areas of the box numbers in the voice mail recorder are managed substantially through the above table means (c), even when the calling party himself or the operator in charge of the relay board does not assign the corresponding recording area, suitable one of the recording areas corresponding to the called party identification data can be automatically selected under the control of the above control means (d). In other words, the need for the calling party himself or the relay board operator to troublesomely assign the corresponding recording area can be removed, and the calling party message can be recorded in one of the recording areas corresponding to the desired party or to a group to which the desired called party belongs. With this arrangement, further, since the recording area relating to message reproduction, i.e., the message reproduction area is also managed through the above table means (c) and the control means (d), the security of a secret message can be suitably realized without requiring the aforementioned special password or the like. It goes without saying that, since the calling party's message is not transmitted to the called party through the intervention of the relay board operator, it can be avoided that the message is wrongly or erroneously transmitted to the called party.

Even with the latter arrangement, as a technique for vocally reproducing the calling party's telephone number and voice message together, when the above control means (d) is arranged, at the time of receiving an incoming signal, to record in the voice mail recorder the calling party's data converted into the voice signal together with the voice message from the calling party, the combined vocal reproduction of these data and voice message can be realized reliably through a very simple control procedure.

DESCRIPTION OF THE PREFERRED EMBODIMENT

Figure 1:
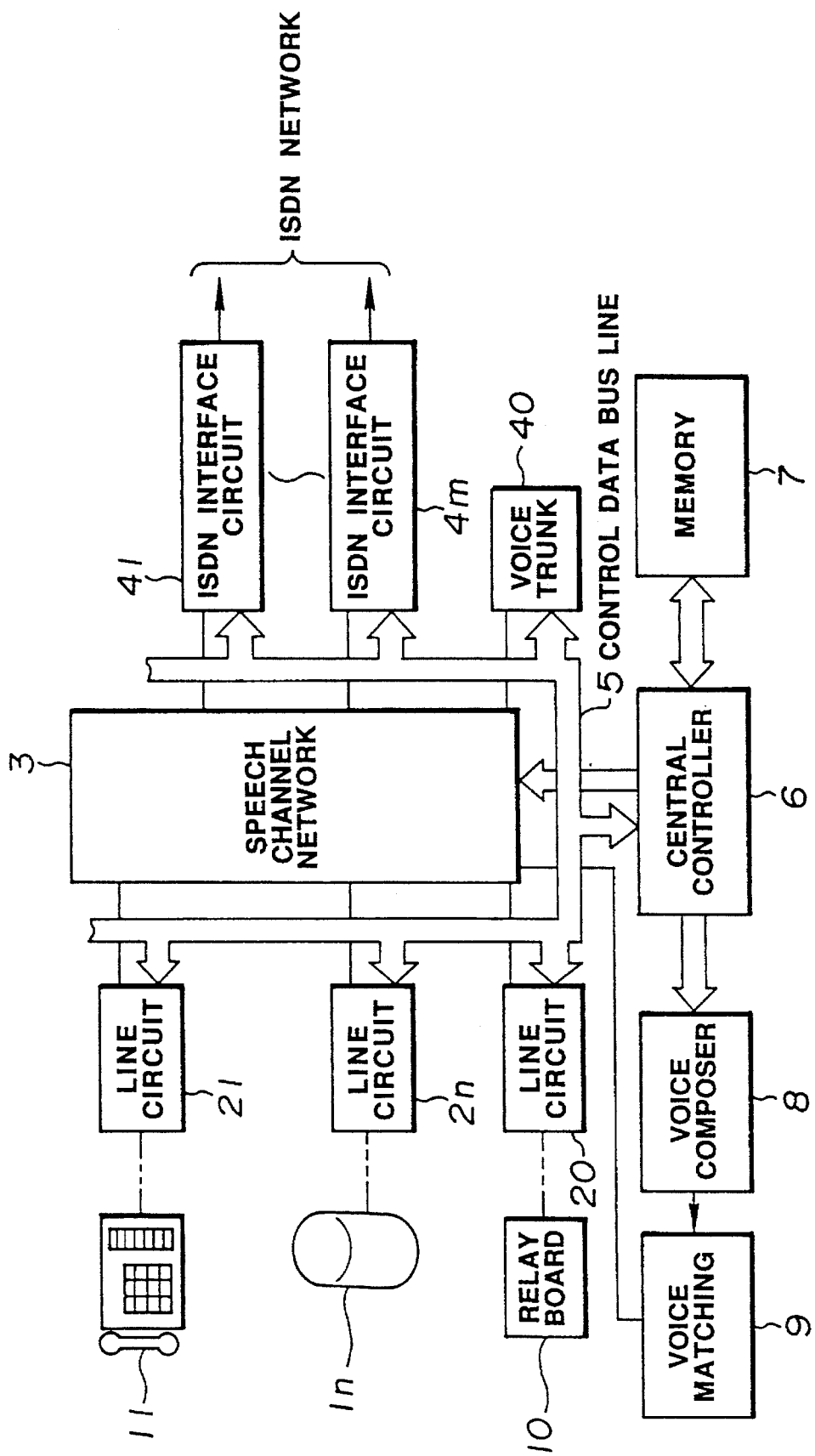
FIG. 1 is a block diagram of an arrangement of a telephone system having a message recording function in accordance with an embodiment of the present invention.

Referring first to FIG. 1, there is shown an arrangement of a telephone system having a message recording function in accordance with an embodiment of the present invention. As shown in FIG. 1, the telephone system of the present invention is intended to perform exchanging control between an ISDN and various-sorts of extension-line terminals under control of an electronic private branch exchange. In the drawing, data collection and control over respective parts of the telephone system of the embodiment through a control data bus line 5 are generally carried out under control of a central controller 6.

The telephone system of FIG. 1 includes a speech channel network 3 which forms voice channels, under control of the central controller 6, between ISDN interface circuits 41 to 4m and line circuits 20 and 21 to 2n, between the line circuits 20 and 21 to 2n and between a voice trunk 40 and the ISDN interface circuits 41 to 4m.

The line circuit 20 is connected with a relay board 10, the line circuits 21 to 2(n–1) other than the line circuit 2n are connected with electronic key telephone sets 11 to 1(n–1), and the line circuit 2n is connected with a voice mail recorder 1n, respectively.

Since the ISDN interface circuits 41 to 4m support layers 1 to 3 based on the open systems interconnection (OSI) Specifications, these interface circuits are connected to the ISDN (not shown). The voice trunk 40 functions, in response to an incoming signal in night-time as mentioned above, to send a voice response message to the calling party to ask whether or not the calling party leave a message to the called party and if so, to prompt the input of the calling party message. The voice trunk 40 usually comprises a voice ROM for storing therein a voice data corresponding to the response message and a voice composer for reading out the voice data from the voice ROM and vocally sounding the read-out data.

The central processor 6 is connected with a memory 7 and a voice composer 8. More specifically, the memory 7 previously stores therein a program for general control of the telephone system and a table (which will be detailed later) showing a correlation between called party identification data and box numbers, which are all used by the central controller 6. The memory 7 is also used as a working area of the central controller 6. On the other hand, the voice composer 8 stores therein voice data such as voices "zero", "one", . . . , and "nine" corresponding respectively to numbers "0", "1", . . . , and "9" for use in telephone numbers; and operates to receive a telephone number from the central controller 6 and to transmit a voice data corresponding to the received telephone number to the speech channel network 3 through a voice matching unit 9. The voice matching unit 9 acts to compress the voice data received from the voice composer 8 to match the format of the voice data with the voice data compression format of the ISDN line.

Figures 2, 3:
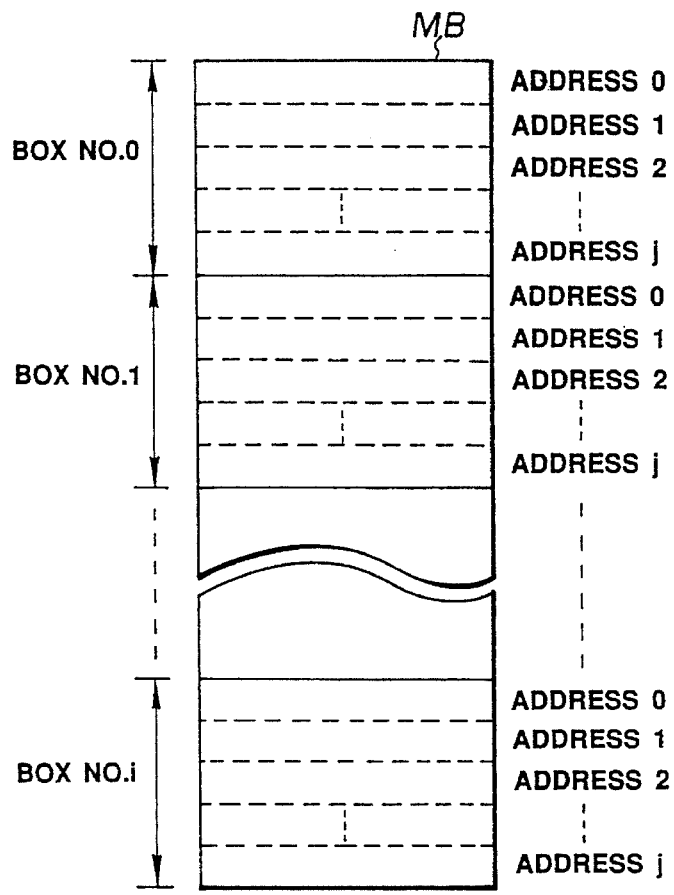
FIG. 2 schematically shows, in a model form, an example of a structure of voice message recording areas in a voice mail recorder.
FIG. 3 schematically shows, in a model form, an example of a structure of a table showing a correlation between the voice message recording areas and call destination identification data.

The voice mail recorder 1n, as already explained earlier, has such a memory block MB consisting of memory areas corresponding to respective box numbers as shown in FIG. 2. Each of the memory areas having the respective box numbers is made up of a plurality of subareas having mutually different addresses, in one of which subareas one voice message is saved.

FIG. 3 shows an exemplary table MT (which will be referred to as the memory table, hereinafter) showing a correlation between called party identification data and box numbers, which table is stored in the memory 7.

In more detail, in the telephone system of the present embodiment, on the basis of an incoming number and an incoming subaddress of an called party identification data received as a layer-3 message from a calling party through the ISDN, the called party is grouped in a predetermined manner depending on different companies, departments or individuals, and different box numbers in the voice mail recorder 1n are allocated to different groups. This is intended, even when one of the box numbers corresponding to a calling party in the voice mail recorder 1n is unknown with respect to a calling party voice message, to automatically register the message with respect to a box number corresponding to the called party or to the group to which the called party belongs. Defined in the memory table MT is such allocation relationship between the incoming number and subaddress and the box number.

More specifically, the memory table MT shown in FIG. 3 as an example defines the following contents. That is:

A voice message for a call having a specified incoming number "A" and an incoming subaddress "a" is recorded in an area with a box number "0".

A voice message for a call having a specified incoming number "A" and an incoming subaddress "b" is recorded in an area with a box number "1".

A voice message for a call having a specified incoming number "A" and an incoming subaddress "c" is recorded in an area with a box number "2".

A voice message for a call having a specified incoming number "B" is recorded in an area with a box number "3" regardless of the contents of its incoming subaddress.

A voice message for a call having a'specified incoming number "C" and an incoming subaddress "a" is recorded in an area with a box number "4".

A voice message for a call having a specified incoming number "C" and an incoming subaddress "b" is recorded in an area with a box number "5".

Thus, the central controller 6, when recording and registering a voice message from a calling party in the voice mail recorder In, determines a box number for which the received voice message is to be recorded and registered by referencing to the defined memory table MT.

Figure 4:
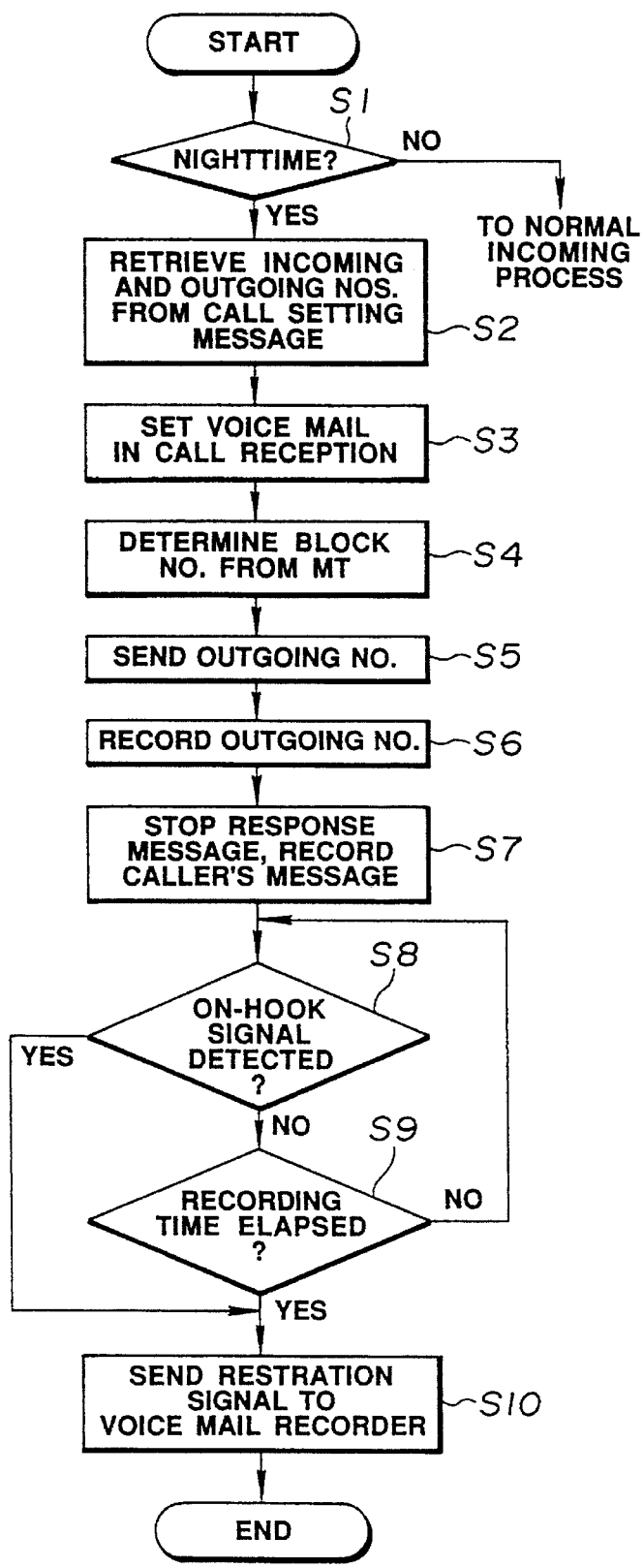
FIG. 4 is a flowchart for explaining an example of the operation of the telephone system of the embodiment.

Shown in FIG. 4 is a flowchart for explaining an exemplary processing procedure of the telephone system of the present embodiment based on the control program stored in the memory 7, in particular, in a nighttime mode. The operation of the telephone system in the nighttime mode will be further detailed by referring to the flowchart of FIG. 4.

Assuming now that the telephone system receives an incoming call from the ISDN, then the telephone system receives a call setting message from the ISDN through any one of the ISDN interface circuits 41 to 4m and informs the central controller 6 of the received call-setting message through the control data bus line 5.

The central controller 6, when subjected to the notification of the call setting message, detects the presence of the incoming call from the ISDN and thereafter performs its predetermined control operation in the following manner.

(1) The central processor 6 first checks whether or not the current operational mode is the nighttime mode (step S1 in FIG. 4) and if not, then performs its normal incoming-signal processing operation. That is, in the normal incoming-signal processing operation, the central controller 6 detects an incoming number and an incoming subaddress from the call setting message to realize transmission of the incoming call to the corresponding extension line. If the central controller 6 determines that the current mode is the nighttime mode, then the central controller 6 carries out the subsequent operation. Whether or not the current operational mode is the nighttime mode can be discriminated, for example, by setting a mode specifying flag in the memory 7. In this case, when the flag is set, for example, to have "1" in the nighttime mode and "0" in the other mode, the operational mode at every time can be easily determined by referring to the contents of the flag. And modification in the setting of the contents of the flag can be automatically realized through dialing input of a specific control code from the relay board 10 or through the timer data (time data) of such a timer means as a clock.

(2) The central controller 6, when determining the nighttime mode, detects incoming number and subaddress data elements as well as outgoing number and subaddress data elements from the received call setting message to read out incoming number and subaddress as well as outgoing number and subaddress therefrom (step S2 in FIG. 4). Such read-out data as the incoming number and subaddress and the outgoing number and subaddress are temporarily stored in a predetermined working area of the memory 7 or in a proper buffer means in the central controller 6.

(3) The central controller 6 then gives an incoming-signal command to the line circuit 2n via the control data bus line 5 to cause the voice mail recorder 1n to be but in its call reception mode (step S3 in FIG. 4). As a result, the voice mail recorder In gets ready for the incoming signal.

(4) The central controller 6, on the basis of the detected incoming number and subaddress, further determines corresponding one of the box numbers of the memory table MT (see FIG. 3) in the memory 7 and sends the determined box number to the voice mail recorder In (step S4 in FIG. 4). In this connection, the box number may be sent through the control data line 5 in the form of a code data or may be sent a DTMF tone corresponding to the box number through the speech channel network 3. In any case, this causes the voice mail recorder 1n to automatically set a memory area for recording of the message, i.e., the box number.

(5) After the box number in the voice mail recorder 1n is determined, the central controller 6 then forms a speech channel between one of the ISDN interface circuits receiving the aforementioned call setting message and the voice trunk 40 through the speech channel network 3 to ask the calling party whether to leave a message directed to the called party. If so, the central controller 6 sends the aforementioned response message via the voice trunk 40 to prompt the calling party to issue the message (step S5 in FIG. 4).

(6) At the same time, the central controller 6 forms a speech channel between the voice mail recorder 1n and the voice composer 8 through the speech channel network 3 to issue a command for start of the recording to the voice mail recorder 1n having the above box number set therein, and also supplies to the voice composer 8 the outgoing number and subaddress temporarily stored therein sequentially from its head one figure after another to instruct the voice composer 8 to generate the corresponding voice. This causes the voice number corresponding to the outgoing number and subaddress sounded from the voice composer 8 to be converted and matched with a predetermined format through the voice matching unit 9, so that the voice number is recorded in the voice mail recorder In at the above set box number (step S6 in FIG. 4).

(7) When the outgoing number and subaddress are once recorded in the voice mail recorder 1n in this way, the central controller 6 issues a recording shop command to the voice mail recorder 1n to once release the recording state of the recorder and also to stop the response message being transmitted from the voice trunk 40 to the calling party with the end of the message (a recording time in which the outgoing number and subaddress are completed to be recorded in the voice mail recorder 1n is much shorter than a transmission time of the response message). Subsequently the central controller 6 forms a speech channel through the speech channel network 3 between the voice mail recorder 1n and the ISDN interface circuit to which the response message has been transmitted, and again issues a command for start of the recording to the voice mail recorder 1n to record a voice message from the calling party (step S7 in FIG. 4). As a result, the voice message of the calling party own subsequent to the voice data of the outgoing number and subaddress is recorded in the recording area of the voice mail recorder 1n at the set box number (more accurately, one of the one-message registering memory subareas determined by the voice mail recorder itself).

(8) Thereafter, the central controller 6 detects the presence or absence of arrival of an on-hook signal from the ISDN (step S8 in FIG. 4) and also detects the presence or absence of termination of the predetermined recording time for the voice mail recorder 1n (step S9 in FIG. 4). The central controller 6, when detecting either one of the above on-hook signal and the termination of the predetermined recording time, again issues the recording stop command to the voice mail recorder 1n to release the recording state thereof and further issues a restoration command thereto to terminate the record processing of the message from the calling party (step S10 in FIG. 4).

Through the above procedure steps (1) to (8), the message record processing to the voice mail recorder 1n with respect to one incoming signal in the nighttime mode is completed.

And the outgoing number and subaddress as well as the voice message from the calling party recorded in the voice mail recorder 1n in this way are later called by the called party later through his suitable reproduction request operation and then vocally reproduced through the associated extension line (electronic key telephone set).

In accordance with the telephone system of the present embodiment, in this way, the outgoing number and subaddress as well as the voice message from the calling party are recorded in the same memory area of the voice mail recorder to be vocally reproduced. As a result, the called party issuing a reproduction request for the calling party's message can listen to and know the outgoing number and subaddress converted into the voice signal, i.e., the calling party's telephone number as if the voice signal were part of the voice message from the calling party. Accordingly, even when the called party wishes to call back to the calling party, the need for troublesomely learning the party telephone number by heart or checking it can be eliminated.

With the telephone system of the present embodiment, further, it will be appreciated from the above recording procedure that, at the time of the vocal reproduction, the calling party's telephone number (outgoing number and subaddress) is first vocally reproduced so that, even when it is unnecessary for the called party to listen to the calling party's message to its end, the calling party's telephone number can be positively transmitted to the called party.

In addition, the telephone system of the present embodiment is arranged so that the box numbers in the voice mail recorder can be managed substantially on the basis of the memory table MT shown in FIG. 3 as an example. As a result, it becomes unnecessary for the calling party or the operator in charge of the relay board to manually assign the corresponding box number, and one of the recording-subareas corresponding to the incoming number and subaddress of the called party identification data can be automatically selected. That is, without requiring any troublesome manual assignment of the box number by the calling party or the relay board operator, the calling party's message can be recorded in the box number corresponding to the party (called party) or corresponding to a group to which the called party belongs to.

With such an arrangement of the telephone system according to the present embodiment, such box number management based on the memory table MT is similarly realized even in the reproduction of the message. Accordingly, the security of the message requiring a secret can be properly attained without requiring specially the aforementioned password or the like. It goes without saying that, since the calling party's message recorded in the voice mail recorder is transmitted to the called party without any intervention of the relay board operator, it can be prevented that the calling party's message is wrongly or erroneously transmitted to the called party.

In the foregoing embodiment, as a technique for vocally reproducing the calling party's telephone number and voice message together, the outgoing number and subaddress detected from the incoming signal are converted into a voice signal and the voice signal is recorded in the voice mail recorder together with the voice message from the calling party, as mentioned above. As a result, the combined vocal reproduction of the telephone number and voice message can be reliably realized through a very simple control procedure. However, the vocal reproduction technique is not limited to the specific example, but any technique may be employed so long as the combined vocal reproduction of the telephone number and voice message can be realized. For example, the outgoing number may not be subjected to any vocal conversion but the number data may, be merely stored in the memory 7 at the time of recording the message so that, the called party later issues its reproduction request, the number data stored in the memory 7 is first vocally converted prior to (or subsequent to) the recorded message.

Although only the calling party's telephone number (outgoing number and subaddress) has been vocally converted in the foregoing embodiment, the calling party's name or call originator's title may be vocally converted simultaneously with the calling party's telephone number so that, when the called party issues a message reproduction request later, the calling party's name or call originator's title subjected to the vocal conversion is vocally reproduced together with the voice message from the calling party. For example, the latter can be realized by previously preparing a separate table showing a predetermined correlation between the calling party's telephone number (outgoing number and subaddress) and calling party's name or call originator's title and storing the table in the memory 7, and when it is desired to execute the vocal conversion of the telephone number, by reading out the corresponding calling party's name or call originator's tile specified based on the table and vocally converting it.

Though the system of the foregoing embodiment has been arranged so that switching operation between the ISDN and the respective extension line terminals is carried out under control of the electronic private branch exchange, the telephone system of the present invention is not limited only to such a system but the present invention may be applied to any network, so long as, in the network, the call originator identification data is contained in an incoming signal or the call originator identification data and called party identification data are both contained in the incoming signal. Thus, the present invention may be suitably applied even to a so-called automatic answering telephone system widely spread in ordinary homes, so long as the above condition is satisfied that the call originator identification data or the call originator and called party identification data are included in an incoming signal. In any circumstances, when the condition is satisfied in the incoming signal mode that the calling party identification data is included in an incoming signal, the calling party's telephone number can be vocally reproduced together with the voice message from the calling party on the basis of the calling party identification data; whereas, when the condition is satisfied in the incoming signal mode that the calling party identification data and the called party identification data are included in the incoming signal, the message registering area of the voice mail recorder can be automatically managed on the basis of the called party identification data in addition to the above. Of course, in such a system environment as not associated with the ISDN, the provision of such a voice matching unit 9 can be omitted.

What is claimed is:

1. A telephone system having a message recording function, comprising:

network interface means connected to a network from which calling party identification data and called party identification data relating to an incoming call are received by the network interface means;

voice mail means having a plurality of memory areas, each associated with different box number, for storing message data;

extracting means for extracting the calling party identification data and the called party identification data transmitted from the network when the network interface means receives the incoming call;

voice synthesizing means for synthesizing a voice signal corresponding at least to a telephone number of the calling party based on the calling party identification data extracted by the extracting means;

table means for storing the box number of the voice mail means corresponding to the called party identification data extracted by the extracting means;

destination designating means for designating the voice mail means as a destination of the incoming call transmitted via the network to the network interface means;

received message storing means for reading out from the table means the box number corresponding to the called party identification data extracted by the extracting means and for storing the voice signal from the voice synthesizing means, together with a voice message transmitted from the calling party via the network, in the memory area associated with the box number of the voice mail means read out from the table means; and voice reproduction means, responsive to a readout request designating the desired box number, for reading out and reproducing the voice signal and the voice message stored in the memory area associated with the designated box number.

2. A telephone system having a message recording function according to claim 1, wherein the network comprises an ISDN network which transmits to the network interface means a call setting message with the incoming call, and wherein the calling party identification data is contained in the call setting message as an outgoing number data element and an outgoing subaddress data element, and the called party identification data is contained in the call setting message as an incoming number data element and an incoming subaddress data element.

3. A telephone system having a message recording function according to claim 1, further comprising response message transmitting means activated in response to the incoming call from the network to the network interface means, for transmitting a response message to the calling party prompting the calling party to input a voice message, and wherein the received message storing means stores the voice signal from the voice synthesizing means in the memory area associated with the box number read out from the table means during a period when the response message transmitting means transmits the response message.

4. A telephone system having a message recording function according to claim 1, wherein the voice reproduction means reads and reproduces the voice signal prior to reading and reproducing of the voice message.

5. A telephone system having a message recording function, comprising:

network interface means connected to a network from which calling party identification data and called party identification data relating to an incoming call are received by the network interface means;

voice mail means having a plurality of memory areas, each associated with a different box number, for storing message data;

extracting means for extracting the calling party identification data and the called party identification data transmitted from the network when the network interface means receives the incoming call;

table means for storing a box number of the voice mail means corresponding to the called party identification data extracted by the extracting means;

destination designating means for designating the voice mail means as a destination of the incoming call received by the network interface means;

received message storing means for storing the calling party identification data extracted by the extracting means, together with a voice message transmitted from the calling party via the network, in the memory area associated with a desired box number of the voice mail means when the network interface means detects the incoming call and while the destination designating means designates the voice mail means as the destination;

readout means, responsive to a readout request designating a box number, for reading out the calling party identification data and the voice message stored in the memory area associated with the designated box number;

voice synthesizing means for synthesizing a voice signal corresponding at least to a telephone umber of the calling party based on the calling party identification data read out by the readout means; and voice reproduction means for reproducing the voice signal from the voice synthesizing means and the voice message read out by the readout means.

6. A telephone system having a message recording function according to claim 5, wherein the network comprises an ISDN network which transmits to the network interface means a call setting message with the incoming call, and wherein the calling party identification data is contained in the call setting message as an outgoing number data element and an outgoing subaddress data element, and the called party identification data is contained in the call setting message as an incoming number data element and an incoming subaddress data element.

7. A telephone system having a message recording function according to claim 5, further comprising response message transmitting means, activated in response to the incoming call from the network to the network interface means, for transmitting a response message to the calling party prompting the calling party to input a voice message, and wherein the received message storing means stores the voice signal from the voice synthesizing means in the memory area associated with the box number read out from the table means during a period when the response message transmitting means transmits the response message.

8. A telephone system having a message recording function according to claim 5, wherein the voice reproduction means reads and reproduces the voice signal prior to reading and reproducing of the voice message.

* * * * *